United States Patent [19]
Gogel
[11] Patent Number: 4,817,670
[45] Date of Patent: Apr. 4, 1989

[54] PRESSURE MEDIUM CONTROL VALVE

[75] Inventor: Andreas Gogel, Winterthur, Switzerland
[73] Assignee: Georg Fischer AG

[21] Appl. No.: 171,478
[22] Filed: Mar. 21, 1988

[30] Foreign Application Priority Data

Mar. 27, 1987 [CH] Switzerland ........................ 01189/87

[51] Int. Cl.[4] ................................................ F16K 11/00
[52] U.S. Cl. ...................................... 137/884; 137/269
[58] Field of Search .................... 137/269, 271, 561 R, 137/884; 251/367

[56] References Cited

U.S. PATENT DOCUMENTS 3,111,139 11/1963 Beckett et al. .................. 251/367 X
3,215,158 11/1965 Bass, Jr. et al. ...................... 137/269
3,509,904 5/1970 Olson .................................. 137/209
3,523,600 8/1970 Nelson ................................ 137/271
4,256,016 3/1981 Thomas .............................. 92/169.2
4,334,785 6/1982 Black ......................... 277/DIG. 6 X

FOREIGN PATENT DOCUMENTS 1764478 1/1958 Fed. Rep. of Germany .

*Primary Examiner*—A. Michael Chambers
*Assistant Examiner*—John C. Fox
*Attorney, Agent, or Firm*—Toren, McGeady & Associates

[57] ABSTRACT

A pressure medium control valve including a valve body and a screw. A plurality of the control valves can be connected to form a multiple-valve unit with a continuous duct for the pressure medium. Each screw has an external thread, a corresponding internal thread and a throughbore. Each screw is screwable with its external thread into the internal thread of the next following screw. The screw can be braced with a shoulder surface against an end face of the valve body. The throughbores in the screws define the continuous duct.

6 Claims, 2 Drawing Sheets

Fig. 3
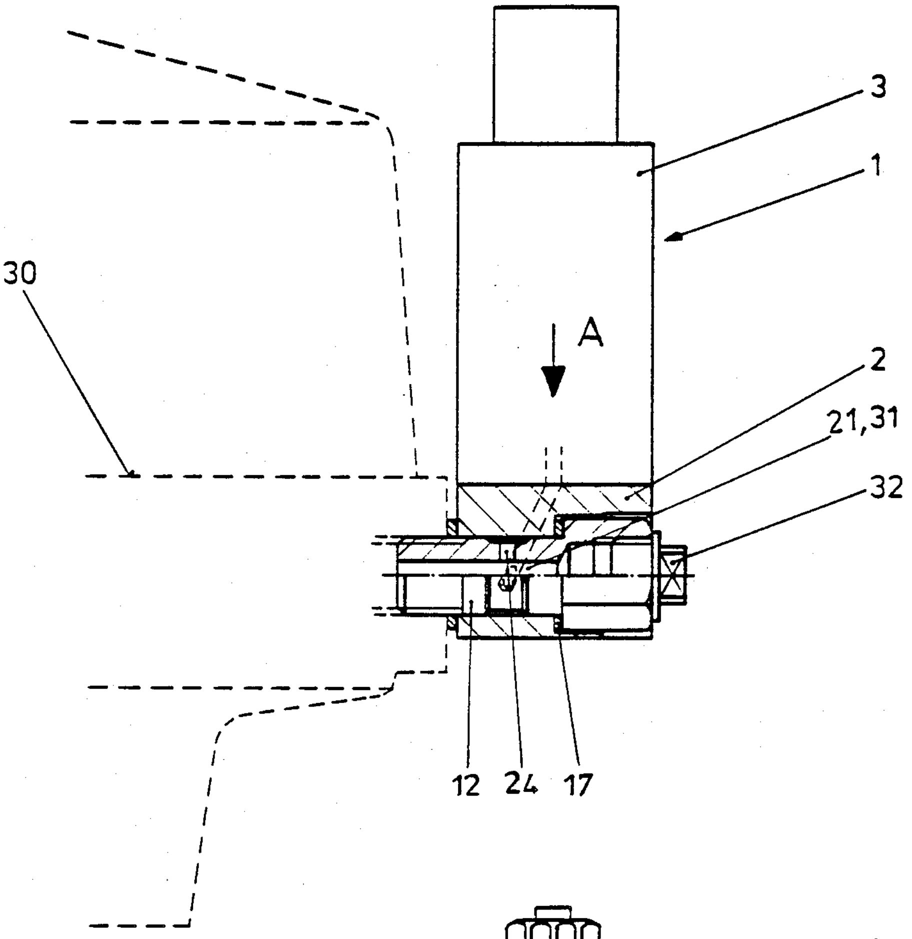
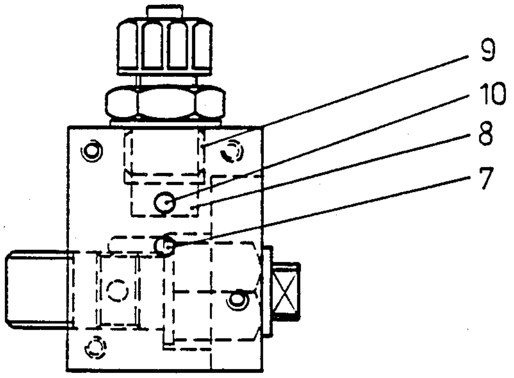
Fig. 4

PRESSURE MEDIUM CONTROL VALVE

BACKGROUND OF THE INVENTION

1. Field of the Invention

The present invention relates to a pressure medium control valve including a valve body and a screw mounted in the valve body. A plurality of the pressure medium control valves can be connected by means of the screws to form a multiple-valve unit. The multiple-valve unit defines a continuous duct for the pressure medium.

2. Description of the Prior Art

German Utility Model 1,764,478 discloses a pressure medium control valve, the valve bodies of which can be braced together by means of continuous screws to form a valve block. Each valve body has a longitudinal bore which extends parallel to the screw holes. Each longitudinal bore is provided with transversely extending bores with threaded connections for the supply of pressure medium. When the valves are combined to form a valve block, many of these transverse bores as well as the ends of the longitudinal bores must again be closed. Accordingly, the pressure medium control valves of this type are difficult to manufacture and assemble and the structural size of the valves are determined by the many bores defined in the valve bodies.

It is, therefore, the primary object of the present invention to provide a pressure medium control valve of the above-described type whose valve body is of small structural size and can be used as an individual valve or in a multiplevalve unit. In addition, the number of bores provided in the valve body and in the connecting means is to be as small as possible.

SUMMARY OF THE INVENTION

In accordance with the present invention, each screw has an external thread, a corresponding internal thread and a throughbore. Each screw can be screwed with its external thread into the internal thread of the next following screw. Each screw can be braced with a shoulder surface against an end face of the valve body. The continuous duct is formed by the throughbores in the screws.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 3 is a view of a pressure medium control valve which is directly connected to a user; and FIG. 4 is a top view in the direction of arrow A of the valve body of FIG. 3 without control portions.

DETAILED DESCRIPTION OF THE INVENTION

Figure 2:
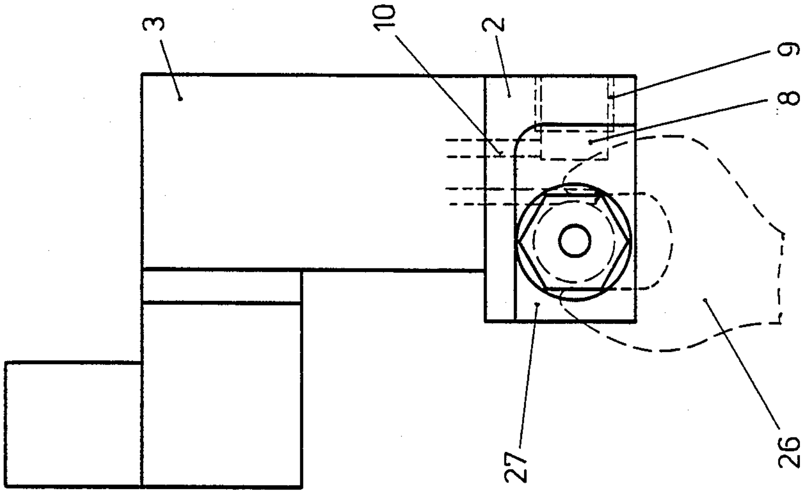
FIG. 2 is a side view in the direction of arrow B of FIG. 1.
Figure 1:
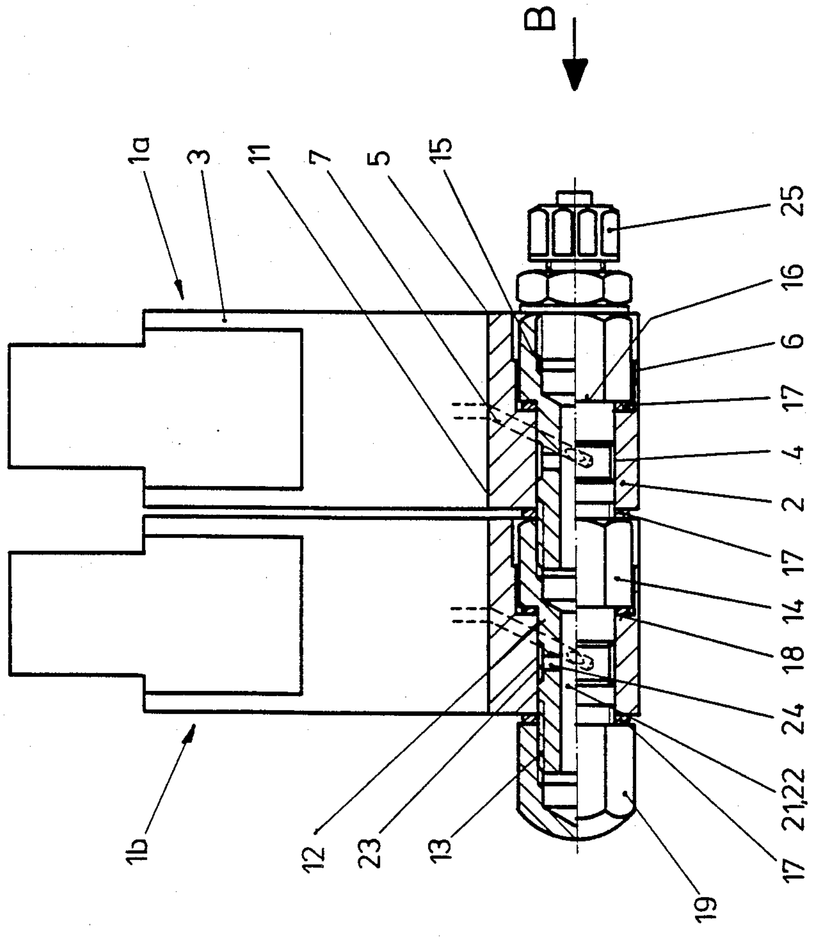
FIG. 1 is a longitudinal sectional view of a multiple-valve unit formed by two pressure medium control valves.

The multiple-valve unit illustrated in FIGS. 1 and 2 of the drawing is composed of two equal pressure medium control valves 1*a*, 1*b*. Each pressure medium control valve 1 includes a valve body 2 and a control portion 3 which, in the illustrated embodiment, is an electrically controllable solenoid valve. Each valve body 2 has a throughbore 4 and a recess 6 arranged at an end face 5 of the valve body 2. A connecting bore 7 leads from the throughbore 4 to a fastening surface 11 on which the control portion 3 is fastened by means of screws. A bore 8 with a threaded connection 9 is arranged at a right angle relative to the throughbore 4. Another connecting bore 10 leads from the threaded connection 9 to the fastening surface 11. Both connecting bores 7, 10 are in communication with corresponding connecting bores in control portion 3. A screw 12 is arranged in each throughbore 4 of the valve bodies 2. Each screw 12 has at one end an external thread 13 and at its other end a screw head 14 with an internal thread 15.

The valve bodies 2 are connected to each other by screwing the external thread 13 of one screw 12 into the internal thread 15 of the next screw 12. A shoulder surface 16 of the screw head 14 can be braced against an end face 18 of the recess 6. A sealing member 17 is placed between shoulder surface 16 and end face 18. The second or last screw 12 of the multiple-valve unit is fixedly braced by screwing a cap nut 19 with a sealing member 17 onto the external thread 13 in the last or second valve body 2. The screws 12 have a throughbore 21 to form a continuous duct 22 extending from the first control valve la to the last control valve 1*b*.

The screw 12 has on its outer circumference an annular groove 23 which is connected to the throughbore 21 through at least one radial bore 24, so that a connection is effected between the duct 22 and the control portion 3 through the radial bore 24 and the connecting bore 7.

A screw pipe coupling 25 is screwed into the internal thread 15 of the first screw 12. A supply line for the pressure medium can be connected to the screw pipe coupling 25. The pressure medium supplied through duct 22 and bores 24 and 7 to each control valve 1*a*, 1*b* is then supplied to the respective user with the valve in the open position through the connecting bore 10 and a pipeline connected to the threaded connection 9.

To make the screw head 14 of screws 12 easily accessible to a fork wrench 26 during assembly, end face 5, in addition to recess 6, is provided with a cutout 27 of less depth, so that the screw head 14 is accessible from two sides, as can be seen in FIG. 2.

To ensure when the individual valve bodies 2 are screwed together by means of screws 12 that these screws are not turned relative to each other, pins, not shown, are provided as a means to protect against rotation on the adjacent end faces 5.

The above-described construction of valve body 2 and screws 12 makes possible a simple combination of a plurality of control valves to form a multiple-valve unit. Since relatively few bores are required in the valve unit, it can be manufactured with very small dimensions.

As illustrated in FIGS. 3 and 4, a control valve 1 having an above-described valve body 2 can be connected directly by means of screws 12 to a user 30, such as, a pneumatic adjusting drive of a valve. For this purpose, screw 12 has a blind-end hole 31 which preferably is formed by closing the throughbore 21 by means of a plug 32 screwed into the internal thread 15.

Consequently, the same screw 12 and the same valve body 2 can be used.

In this situation, pressure medium is supplied through threaded connection 9, bore 8 and connecting bore 10 to control portion 3. When the valve is open, the pressure medium reaches the user through connecting bore 7, radial bore 24 and blind-end hole 31.

A direct fastening of the control valve to the pressure generator by means of screw 12 is also possible. In this case, the direction of flow of the pressure medium is reversed.

The above-described pressure medium control valve with valve body 2 and screw 12 can be used for many applications and, therefore, can be manufactured economically in large numbers.

While a specific embodiment(s) of the invention has been shown and described in detail to illustrate the application of the inventive principles, it will be understood that the invention may be embodied otherwise without departing from such principles.

I claim:

1. In a pressure medium control valve including a valve body and a screw mounted in the valve body, wherein a plurality of pressure medium control valves are combinable in a multiple-valve unit, the multiple-valve unit defining a continuous duct for the pressure medium, the improvement comprising each screw having an external thread, a corresponding internal thread and a throughbore, each screw being screwable with the external thread thereof into the internal thread of the next following screw, each screw defining a shoulder surface and each valve body defining an end face, the shoulder surface being braceable against the end face, the throughbores in the screw defining the continuous ducts.

2. The control valve according to claim 1, wherein the screw has an outer circumference, an annular groove defined in the outer circumference, at least one radial bore defined in the screw, the annular groove being connected to the throughbore through the at least one radial bore, the valve body defining in the region of the annular groove a connecting bore to a valve control portion.

3. The control valve according to claims 1 or 2, wherein the internal thread of the screw arranged in the first valve body defines a supply connection for the pressure medium, and wherein a cap screw closing the continuous duct is arranged on the external thread of the last screw which external thread projects beyond the last valve body.

4. The control valve according to claim 3, wherein the valve bodies are positioned relative to each other and secured against rotation by means of the screw and a pin.

5. The control valve according to claim 3, wherein the end face of the valve body has a cutout which is open toward two circumferential sides of the valve body.

6. The control valve according to claim 1, wherein the valve is adapted for being directly connected to a user, the internal thread of the screw being closed by means of a plug.

* * * * *